United States Patent [19]
Doyle et al.

[11] Patent Number: 5,137,764
[45] Date of Patent: Aug. 11, 1992

[54] FLOOR STRUCTURE INCORPORATING A VAPOR AND GAS BARRIER

[76] Inventors: Dennis J. Doyle, 6795 Wilson Rd., Lancaster, Ohio 43130; Robert S. Miller, 4208 Greensview Dr., Columbus, Ohio 43220

[21] Appl. No.: 623,177

[22] Filed: Dec. 6, 1990

[51] Int. Cl.$^5$ .............................................. B32B 3/10
[52] U.S. Cl. ........................................ 428/44; 428/48; 428/50; 428/247; 428/255; 428/461; 428/462; 428/537.1; 52/408; 52/410; 52/411; 52/390
[58] Field of Search .................. 428/50, 48, 44, 255, 428/247, 461, 462, 537.1; 52/408, 410, 411, 390, 393, 384

[56] References Cited

U.S. PATENT DOCUMENTS

| | | | |
|---|---|---|---|
| 2,196,387 | 4/1940 | Elmendorf | 428/50 |
| 2,708,170 | 5/1955 | Hampton | 156/71 |
| 3,712,845 | 1/1973 | Hartung | 428/47 |
| 4,077,168 | 3/1978 | Smith | 428/464 |
| 4,507,347 | 3/1985 | Lupton | 428/246 |
| 4,682,459 | 7/1987 | Stephenson | 52/390 |
| 4,727,116 | 2/1988 | Lange | 525/326.9 |
| 4,882,888 | 11/1989 | Moore | 52/408 |
| 4,910,936 | 3/1990 | Abendroth | 52/408 |
| 4,931,331 | 6/1990 | Owens | 428/47 |
| 4,974,382 | 12/1990 | Avellanet | 52/408 |

FOREIGN PATENT DOCUMENTS 960006  6/1964  United Kingdom ................ 428/50

OTHER PUBLICATIONS

"Condensation Control for Houses", Architectural Engineering, Feb. 1950, pp. 135-137.

Primary Examiner—Ellis P. Robinson
Assistant Examiner—Nasser Ahmad
Attorney, Agent, or Firm—Vorys, Sater, Seymour & Pease

[57] ABSTRACT

A floor structure having good resistance to the passage of water vapor and gases comprises
  a supporting structural substrate,
  a water-based adhesive layer coated on the structural substrate,
  a synthetic resin-metal foil laminate sheet in contact with the adhesive layer,
  a layer of water-based mastic applied to the resin-metal foil laminate, and
  a finish floor layer in contact with the mastic layer, or intermediate supporting layer(s) adhered to the mastic layer, with a finish floor layer secured to the supporting layer.

10 Claims, 4 Drawing Sheets

FLOOR STRUCTURE INCORPORATING A VAPOR AND GAS BARRIER

BACKGROUND OF THE INVENTION

1. Field of the Invention

This invention relates to floor structures of buildings and more particularly to floor structures incorporating a barrier to the passage of water vapor and gases.

2. Brief Description of the Prior Art

In climates which do not experience winter temperatures low enough to cause substantial freezing of the ground, houses and light commercial buildings are often constructed on relatively shallow foundations, with the ground floor, typically a concrete slab, supported directly on grade. A finish floor, e.g., asphalt tile, wood, or the like, can be installed over the concrete slab by simply setting it in a mastic adhesive trowelled onto the substrate. In geographical areas where the water table is relatively close to the surface, however, this construction presents certain problems when wood flooring is laid directly on the concrete support, because water vapor migrating from the moist soil through the concrete slab can cause the wood flooring to swell and warp. More recently, radon infiltration from the soil into buildings has been recognized as a health hazard in certain regions, and attempts have been made to devise floor structures to exclude radon.

In order to prevent water vapor damage, it is customary to install a vapor barrier between the upper surface of the concrete slab and the wooden flooring. One known type of floor structure having a vapor barrier is a multi-layer structure constructed by applying a cut-back asphalt adhesive over the concrete slab, laying down a synthetic resin vapor barrier, e.g., a 6-mil polyethylene film, on the asphalt adhesive, trowelling a cutback adhesive over the barrier layer, and setting the wood floor in the adhesive. While this construction is effective, the flammable and odoriferous character of the cutback asphalt as well as its toxicity and suspected carcinogenicity have caused this method of installing a vapor barrier to fall into disfavor. Alternative adhesives have been tried, such as epoxy-based adhesives, but these have not been entirely satisfactory. Epoxy adhesives are formulated from ingredients that must be mixed in exact proportions and must be mixed very thoroughly, with the consequence that they are difficult to use. Low viscosity sodium silicate adhesives have also proved unsatisfactory. An effective structure is achieved by installing a low cost vinyl roll flooring over the concrete slab and laying the wood floor on top of it, but this construction amounts to laying two floors.

Certain structures incorporating multiple layers have been described in a number of U.S. Patents. U.S. Pat. No. 3,712,845, to Hartung, discloses a substrate surface covered with a continuous sheet of synthetic resin upon which are laid textile tiles having a synthetic resin backing. The synthetic resin backing is applied to the fabric as a hot melt. The tiles are simply laid on the synthetic resin sheet, with the backing and sheet materials being elected to have sufficient adhesion to prevent warping, shifting, or the like, of the carpet tiles. Neither assembly of the structural elements with curable adhesive nor vapor barrier properties of the structure are disclosed in the Hartung patent.

A roofing construction using a metal foil vapor barrier is disclosed in U.S. Pat. No. 2,708,170, to Hampton. A base sheet, comprised of one or more layers of asphalt saturated felt is applied to a roof, covered with a metal foil vapor barrier, e.g., aluminum foil, and the laminate is then covered with a roofing seal or cement in which rock chips are embedded.

A wall structure incorporating conventional gypsum wallboard having a paper-metal foil laminate adhered to its exterior-facing surface to serve as a vapor barrier is disclosed in U.S. Pat. No. 4,077,168, to Smith. The foil side of the paper-foil laminate is adhered to the wallboard, leaving the paper side exposed to provide a surface that can be securely fastened to the building structure, e.g., studs or joists, with an adhesive.

In view of the deficiencies in the known methods of installing a floor having a vapor and gas barrier, a need has continued to exist for a floor structure that resists penetration of vapor or gas and is constructed of materials that are environmentally and industrially acceptable.

SUMMARY OF THE INVENTION

This goal has now been accomplished by a floor structure comprising:
 a supporting structural substrate,
 a water-based adhesive layer coated on said structural substrate,
 a synthetic resin-metal foil laminate sheet in contact with said adhesive layer,
 a layer of water-based mastic applied to said resin-metal foil laminate, and
 a finish floor layer in contact with said mastic layer.

Accordingly, it is an object of this invention to provide a floor structure incorporating a vapor and gas barrier.

A further object is to provide a floor structure having a vapor barrier adhesively fastened to a supporting structure by means of a water-based adhesive.

A further object is to provide a floor structure having a vapor and gas barrier comprising a synthetic resin-metal foil laminate sheet.

A further object is to provide a wood floor adhesively bonded to a support structure-vapor barrier composite structure by means of a water-based mastic.

Further objects of the invention will become apparent from the description of the invention which follows.

DETAILED DESCRIPTION OF THE INVENTION AND PREFERRED EMBODIMENTS

Figure 1:
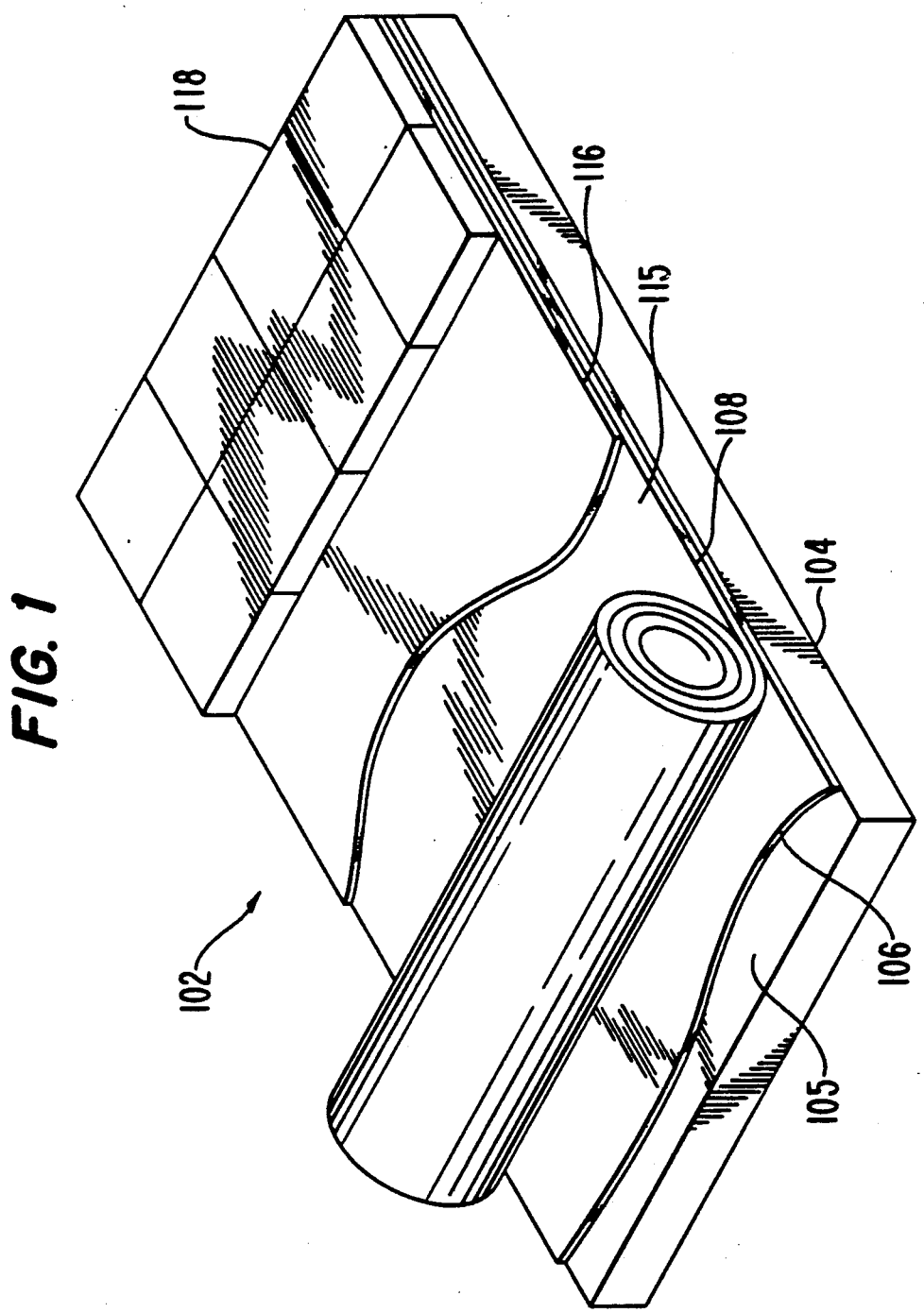
FIG. 1 shows a view of the floor structure of the invention showing its assembly.

The invention will now be described in detail with reference to the drawings, wherein the elements of the invention are identified by reference numerals which refer to the same elements in each of the drawings.

Figure 2:
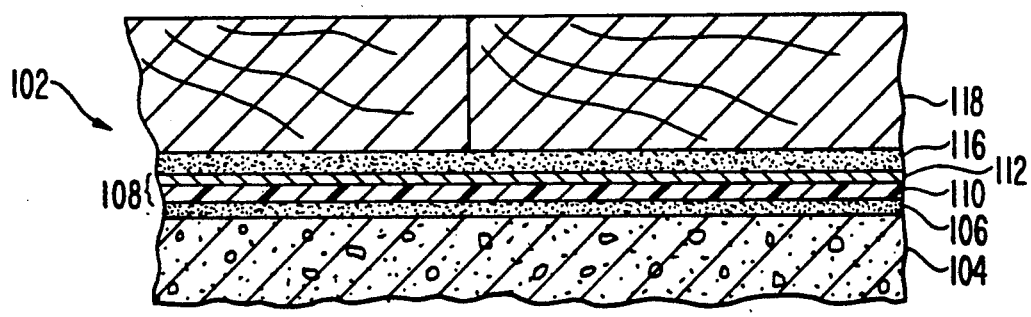
FIG. 2 illustrates a schematic elevational cross-section of an embodiment of the floor structure of the invention.
Figure 3:
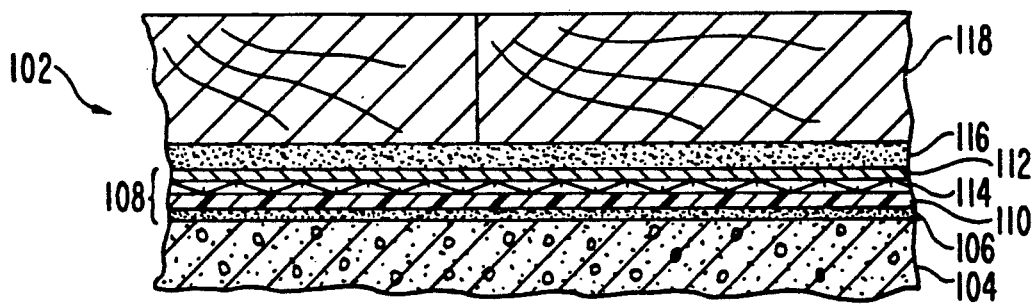
FIG. 3 illustrates a schematic elevational cross-section of an embodiment of the floor structure of the invention wherein the barrier layer incorporates a fabric scrim.

The improved floor structure of the invention, designated generally by reference numeral 102, comprises a substantially rigid substrate 104 that constitutes the supporting structure of the floor assembly 102. The substrate 104 may be any structure capable of providing support for a floor and having a generally smooth and planar upper surface. It will be understood that deviations from planarity that do not affect the utility of the surface as a floor substrate are not excluded. The substrate 104 will often be a concrete slab as shown in FIGS. 2 and 3, particularly a concrete slab laid directly on grade. However, the substrate may also be a subfloor supported on joists mounted on a conventional foundation or basement.

In installing the finish flooring 118 on the substrate 104 the upper surface 105 of the substrate 104 is coated with a layer of a water-based adhesive 106. The layer can be applied by conventional means such as rolling, spraying, trowelling, extruding, and the like, and may be a curable adhesive or one that dries to form a pressure sensitive adhesive layer. Although the adhesive is water-based, it will be understood that the aqueous component of the adhesive serves as a vehicle only and is allowed to evaporate before the vapor barrier layer is installed over it. The water-based adhesive may be any such adhesive that provides a secure bond to the vapor barrier 108 superimposed on the layer. A preferred type of adhesive is a vinyl acetate-acrylic ester curable, solvent-free adhesive, such as that sold by Franklin International, Inc., Columbus, Ohio, under the designation "FA1010 Hydrobarrier III Adhesive".

The vapor barrier 108 is laid over the layer of adhesive 106 and preferably smoothed to provide a surface for supporting the finish flooring 118. The vapor barrier may be any thin material that is substantially impermeable to water vapor. While absolute impermeability to water vapor is not required, the permeability of the vapor barrier 108 must be low enough so that no substantial swelling or warping of the finish flooring is produced by any water vapor that may pass through the barrier. In general, the lower the permeability to water vapor, the better. The same considerations apply where the barrier is intended to prevent infiltration of harmful gases such as radon; the lowest possible permeability to radon gas is desirable. In practice the vapor barrier 108 may be made from any synthetic resin film exhibiting a low permeability to water vapor. Such film include especially polyolefin films such as polyethylene, polypropylene, polybutylene and the like, as well as polyvinylidene chloride and the like. Although metal foils exhibit low vapor permeability, they are not commonly used because of their fragility and consequent difficulty of installation. A preferred vapor barrier 108 of the invention is comprised of a laminate of thin metallic foil 112 and a synthetic resin film 110. The laminate vapor barrier material 108 may be prepared by melt-bonding, or laminating by other conventional means, the synthetic resin 110 to the metal foil 112. The polymeric layer 110 can be any synthetic resin having suitable properties for being formed into a self-supporting film.

Figure 4:
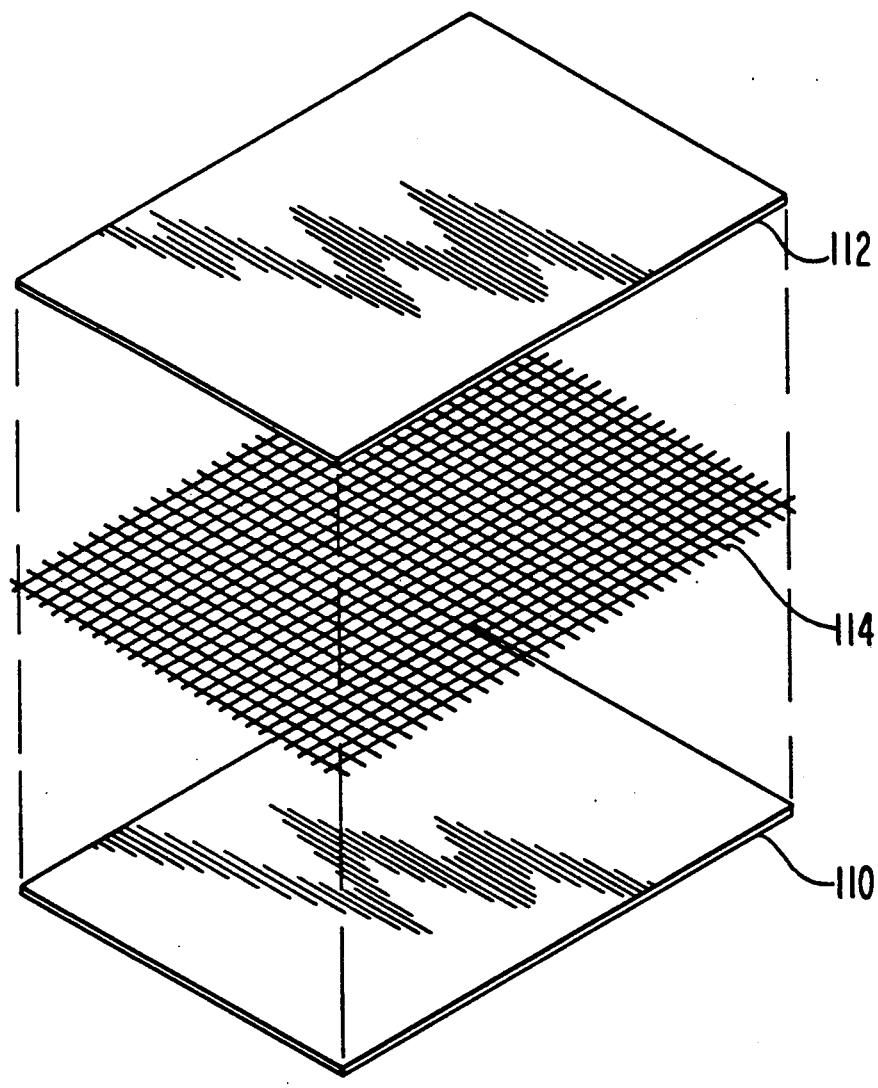
FIG. 4 illustrates an exploded view of the vapor barrier incorporating a fabric scrim used in a preferred embodiment of the invention.

While it is preferable to use a synthetic polymer that has low permeability to water vapor and gases, when the metal foil-synthetic resin film laminate is used, the excellent resistance of the metal foil to the passage of water vapor permits the use of synthetic resin films having somewhat higher permeability to water vapor. Nevertheless, the preferred embodiment of the vapor barrier 108 used in the structure of this invention is comprised of a layer of a polyolefin resin, e.g., polyethylene or polypropylene, bonded to a layer of metal foil e.g., aluminum foil. The strength of the foil-plastic laminate may be enhanced by incorporating a loosely woven scrim textile 114 into the laminate. For example, a scrim made from glass fiber may be laminated between the metal foil 112 and the synthetic resin film 110, as illustrated in the exploded view of FIG. 4. A preferred vapor barrier material would be a laminated material comprises a layer of polypropylene having a thickness of about 0.0015 inches bonded to a layer of aluminum foil having a thickness of about 0.0003 inches, with a coarse reinforcing scrim of woven glass fiber between the two layers. A suitable vapor barrier material is obtainable from Franklin International, Columbus, Ohio under the designation "Hydrobarrier III Foil".

The metal foil-synthetic resin film laminated vapor barrier 108 may be installed with the metal foil side or the plastic film side in contact with the adhesive layer 106 coated on the substrate 104. It is preferred that the synthetic resin side 110 of the laminate 108 be in contact with the adhesive layer on the substrate, while the metal foil layer 112 is uppermost.

On the upper surface 115 of the vapor barrier 108 a layer of a water-based mastic 116 is laid down. This mastic can be any conventional water-based mastic designed for installation of floor tiles and the like. A preferred mastic is an emulsion mastic is sold by Franklin International, Columbus, Ohio, under the designation "Titebond ES1011 Wood Flooring Adhesive".

Finally, the finish flooring 118 is installed by embedding it in the mastic layer. While the flooring structure of this invention is designed to provide special advantages in the installation of wood flooring, the finish flooring can be any conventional flooring material such as wood parquet or plank, vinyl tile, textile tile, carpet roll goods, or the like. Even continuous vinyl roll flooring can be installed in accordance with this invention.

Figure 5:
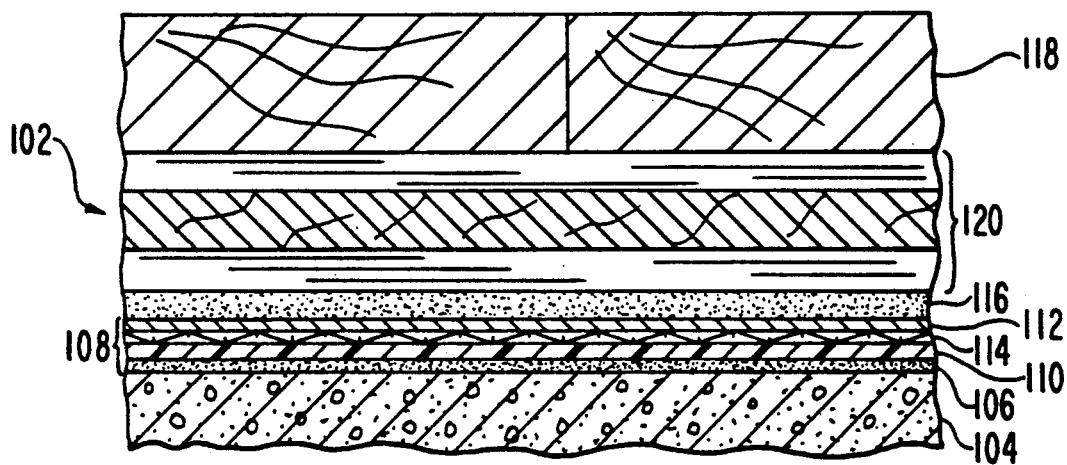
FIG. 5 illustrates an embodiment of the invention incorporating a subfloor.
Figure 6:
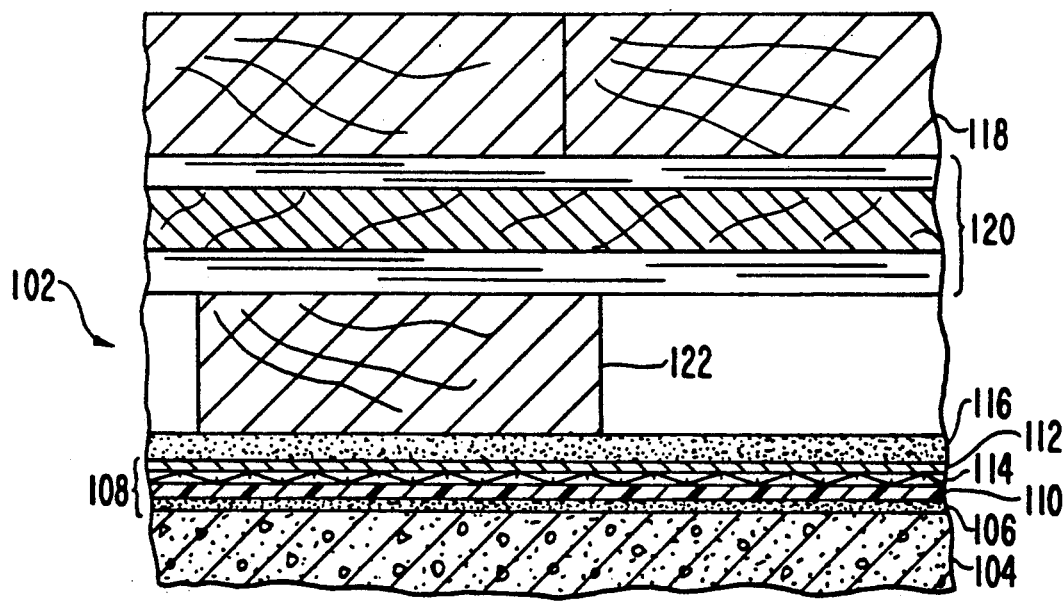
FIG. 6 illustrates an embodiment of the invention wherein a subfloor and a finish floor are spaced from the substrate by wooden screeds.

In another embodiment of this invention, illustrated in FIG. 5, an intermediate subfloor 120, e.g., a layer of plywood, may be installed between the vapor barrier material and the finished flooring. In this instance, the vapor barrier 108 would be installed with the plastic film side in contact with the adhesive 106 coated on the substrate 104. A layer of the water-based mastic 116 is then laid down over the metal foil layer 112 and wooden panels, usually 4×4" sheets of $\frac{3}{4}$" plywood, are placed onto the mastic. Finished wood flooring 118 is then either nailed or adhesively bonded to the plywood 120. If the finish flooring is installed by nailing, care must be taken that the nails do not pierce the vapor barrier.

In a further embodiment, instead of contacting the mastic with plywood as in the above embodiment, a wooden screed 122, usually formed from 2"×2" or 2"×4" lathing, is placed onto the mastic layer 116 and a plywood layer 120 is then either nailed or adhesively bonded to the screed 122. The flooring 118 is then either nailed or bonded to the plywood layer 120.

All of these embodiments are included within the scope of this invention, because in all instances the invention prevents water from gaining access to the finished flooring, protects against swelling and warping of wooden flooring, for example, and discourages mold and mildew by eliminating the moist conditions favorable to their growth. The use of water-based adhesives and mastics as in this invention, especially those which are solvent-free, provides a floor structure which is environmentally benign and safe to install, while retaining the advantages of adhesively installed flooring.

The invention having now been fully described, it should be understood that it may be embodied in other specific forms or variations without departing form its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein. The use of water-based adhesives and mastics, especially those which are solvent-free, provides a floor structure which is environmentally benign and safe to install, while retaining the advantages of adhesively installed flooring.

The invention having now been fully described, it should be understood that it may be embodied in other specific forms or variations without departing form its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

What is claimed is:

1. A floor structure consisting essentially of, a supporting structural substrate, a water-based adhesive layer coated on said structural substrate, a synthetic resin-metal foil laminate sheet in contact with said adhesive layer, said laminate sheet being substantially impervious to moisture and gas, a layer of water-based mastic applied to said resin-metal foil laminate, and a finish floor layer in contact with said mastic layer.

2. The structure of claim 1 wherein said water-based curable adhesive is a pressure-sensitive, solvent-free adhesive.

3. The structure of claim 2 wherein said water-based adhesive is an acrylate ester polymer adhesive.

4. The structure of claim 3 wherein said water-based adhesive is a vinyl acetate-acrylate ester polymer adhesive.

5. The structure of claim 1 wherein said water-based mastic is solvent-free.

6. The structure of claim 1 wherein said vapor barrier incorporates a scrim fabric reinforcement.

7. The structure of claim 1 wherein said finish floor layer is made of wood.

8. The structure of claim 1 wherein said floor covering comprises wooden parquet.

9. A floor structure consisting essentially of
   a supporting structural substrate,
   a water-based adhesive layer coated on said structural substrate,
   a synthetic resin-metal foil laminate sheet in contact with said adhesive layer, said laminate sheet being impervious to moisture and gas
   a layer of water-based mastic applied to said resin-metal foil laminate,
   a supporting floor layer in contact with said mastic layer, and
   a finished floor layer secured to said supporting layer.

10. A floor structure consisting essentially of
    a supporting structural substrate,
    a water-based adhesive layer coated on said structural substrate,
    a synthetic resin-metal foil laminate sheet in contact with said adhesive layer, said laminate sheet being impervious to moisture and gas
    a layer of water-based mastic applied to said resin-metal foil laminate,
    a wooden screed in contact with said mastic layer,
    a wooden supporting layer secured to said screed, and
    a finished wood flooring layer secured to said supporting layer.

* * * * *